(12) United States Patent
Parkvall et al.

(10) Patent No.: US 10,355,846 B2
(45) Date of Patent: Jul. 16, 2019

(54) METHODS AND NODES FOR SOFT CELL UPLINK PRIORITIZATION

(71) Applicant: TELEFONAKTIEBOLAGET L M ERICSSON (PUBL), Stockholm (SE)

(72) Inventors: Stefan Parkvall, Stockholm (SE); Erik Dahlman, Bromma (SE); Bengt Lindoff, Bjärred (SE); Robert Baldemair, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 429 days.

(21) Appl. No.: 13/700,590

(22) PCT Filed: Oct. 12, 2012

(86) PCT No.: PCT/SE2012/051097
§ 371 (c)(1),
(2) Date: Nov. 28, 2012

(87) PCT Pub. No.: WO2014/003623
PCT Pub. Date: Jan. 3, 2014

(65) Prior Publication Data
US 2014/0079031 A1    Mar. 20, 2014

Related U.S. Application Data

(60) Provisional application No. 61/664,404, filed on Jun. 26, 2012.

(51) Int. Cl.
*H04J 3/00* (2006.01)
*H04L 5/00* (2006.01)
(Continued)

(52) U.S. Cl.
CPC ............ *H04L 5/0058* (2013.01); *H04L 5/001* (2013.01); *H04W 72/04* (2013.01); *H04W 76/15* (2018.02); *H04L 5/0048* (2013.01); *H04L 5/0055* (2013.01)

(58) Field of Classification Search
CPC ..... H04W 24/08; H04W 24/02; H04W 24/04; H04W 88/08; H04W 24/10; H04W 84/12; H04W 48/16; H04W 88/02
(Continued)

(56) References Cited

U.S. PATENT DOCUMENTS

2003/0054812 A1* 3/2003 Hunzinger ............. H04B 7/022
455/423
2006/0039326 A1* 2/2006 Jeong ................ H04W 36/0055
370/329
(Continued)

FOREIGN PATENT DOCUMENTS

EP    2343945 A2    7/2011
EP    2442595 A1    4/2012
(Continued)

OTHER PUBLICATIONS

Qualcomm Europe, "UE Support of APN-AMBR", 3GPP TSG-RAN WG2 #63bis, Prague, Czech Republic, Sep. 29, 2008, pp. 1-3, R2-085141, 3GPP, [Retrieved on Apr. 2, 2013], Retrieved from Internet: http://www.3gpp.org/ftp/Specs/html-info/TDocExMtg--R2-63b--27165.htm.

*Primary Examiner* — Un C Cho
*Assistant Examiner* — Atique Ahmed
(74) *Attorney, Agent, or Firm* — Sage Patent Group

(57) ABSTRACT

The invention relates to a method in a wireless device for mapping a logical channel to one of a first and a second link. The first link is maintained to a first radio network node and the second link is maintained to a second radio network node. The method comprises obtaining (910) information
(Continued)

indicating to which of the first and the second links one or more of at least one logical channel is mapped. The method also comprises selecting (920) a logical channel among the at least one logical channel, and mapping (930) the selected logical channel to one of the first and the second links based on the obtained information. The invention also relates to a corresponding method in the first radio network node.

27 Claims, 10 Drawing Sheets

(51) Int. Cl.
*H04W 72/04* (2009.01)
*H04W 76/15* (2018.01)

(58) Field of Classification Search
USPC .................................. 370/336, 328; 455/423
See application file for complete search history.

(56) References Cited

U.S. PATENT DOCUMENTS

| | | |
|---|---|---|
| 2008/0232401 A1* | 9/2008 | Ahmadi et al. ............... 370/469 |
| 2009/0323842 A1 | 12/2009 | Zhang et al. |
| 2011/0170495 A1* | 7/2011 | Earnshaw ............. H04W 72/02 370/329 |
| 2011/0281615 A1* | 11/2011 | Yamada et al. ............... 455/524 |
| 2011/0305213 A1* | 12/2011 | Lohr ..................... H04L 1/1887 370/329 |
| 2012/0044870 A1* | 2/2012 | Mochizuki ............. H04B 7/024 370/328 |
| 2012/0140743 A1 | 6/2012 | Pelletier et al. |
| 2013/0111038 A1* | 5/2013 | Girard ................... H04L 45/245 709/226 |
| 2013/0176988 A1* | 7/2013 | Wang et al. .................. 370/331 |

FOREIGN PATENT DOCUMENTS

| | | |
|---|---|---|
| WO | 2006016786 A1 | 2/2006 |
| WO | 2012082023 A1 | 6/2012 |

* cited by examiner

METHODS AND NODES FOR SOFT CELL UPLINK PRIORITIZATION

TECHNICAL FIELD

The disclosure relates to a method in a wireless device for mapping a logical channel to one of a first and second link, wherein the first link is maintained to a first radio network node and the second link is maintained to a second radio network node. The disclosure also relates to a corresponding method in the radio network node, and to the wireless device and the radio network node.

BACKGROUND

3GPP Long Term Evolution (LTE) is the fourth-generation mobile communication technologies standard developed within the $3^{rd}$ Generation Partnership Project (3GPP) to improve the Universal Mobile Telecommunication System (UMTS) standard to cope with future requirements in terms of improved services such as higher data rates, improved efficiency, and lowered costs. The Universal Terrestrial Radio Access Network (UTRAN) is the radio access network of a UMTS and Evolved UTRAN (E-UTRAN) is the radio access network of an LTE system. In an E-UTRAN, a wireless device such as a User Equipment (UE) is wirelessly connected to a Radio Base Station (RBS) commonly referred to as an evolved NodeB (eNodeB) in LTE. An RBS is a general term for a radio network node capable of transmitting radio signals to a UE and receiving signals transmitted by a UE. The eNodeB is a logical node in LTE and the RBS is a typical example of a physical implementation of an eNodeB. A UE may in the following also be referred to as a terminal.

FIG. 1 illustrates a radio access network in an LTE system. An eNodeB 101a serves a UE 103 located within the eNodeB's geographical area of service also called a cell 105a. The eNodeB 101a is directly connected to the core network (not illustrated). The eNodeB 101a is also connected via an X2 interface to a neighboring eNodeB 101b serving another cell 105b. Although the eNodeBs of this example network serves one cell each, an eNodeB may serve more than one cell.

The use of a so called heterogeneous deployment or heterogeneous network consisting of radio network nodes transmitting with different transmit power and operating within overlapping coverage areas, is an interesting deployment strategy for cellular networks. In such a deployment schematically illustrated in FIG. 2a, low-power nodes such as pico nodes 210 are typically assumed to offer high data rates measured in Mbit/s, as well as to provide high capacity e.g. measured in users/m² or in Mbit/s/m², in local areas where this is needed or desired. High-power nodes, often referred to as macro nodes 220, are assumed to provide full-area coverage. In practice, the macro nodes 220 may correspond to currently deployed macro cells 221, while the pico nodes 210 are later deployed nodes, extending the capacity and/or achievable data rates in a pico cell 211 within the macro cell 221 coverage area where needed.

In a traditional heterogeneous deployment, schematically illustrated in FIG. 2b, each pico node 210 creates a cell of its own, a so called pico cell 211. This means that, in addition to downlink and uplink data transmission and reception transmitted on the pico link 213 maintained between the pico node 210 and the wireless device 212, the pico node 210 also transmits the full set of common signals and channels associated with a cell. In an LTE context this includes the primary and secondary synchronization signals, cell-specific reference signals, and system information (SI) related to the cell, in FIG. 2b referred to as SI pico and illustrated by the dashed line cell overlying the pico cell 211.

In an alternative deployment, illustrated in FIG. 2c, a terminal or wireless device 212 in the range of a pico node 210, i.e. in the subarea 214 covered by the pico node, may be simultaneously connected to both the macro node 220 and the pico node 210. To the macro node 220 covering the area 222, the terminal 212 maintains a connection or link, e.g. used for Radio Resource Control (RRC) such as mobility control. The connection or link maintained to the macro node 220 may be referred to as an anchor link 223. Furthermore, the terminal 212 maintains a connection or link to the pico node 210, used primarily for data transmission. The connection or link maintained to the pico node 210 may be referred to as a booster link 213. This approach is in the following referred to as a soft cell approach. The soft cell approach has several benefits such as mobility robustness and improved energy efficiency. The SI related to the soft cell is in FIG. 2c illustrated by a cell with a dashed line overlying the area 222. Since the macro layer is responsible for providing e.g. SI and basic mobility management, the pico node in essence only needs to be active when transmitting data to the terminal. This can lead to significant gains in energy efficiency and an overall reduction in interference as the pico nodes can be silent in periods of no data transmission activity. Macro and pico node transmission can either occur on different frequencies in a frequency-separated deployment, or on the same frequency in a same-frequency deployment.

LTE Uplink Power Control

To control the received signal power in the uplink, LTE employs uplink power control. The power-control mechanism consists of two parts:

An open-loop part where the terminal sets the approximate transmission power based on the estimated path loss between the base station and the terminal;

A closed-loop part where the network can instruct the terminal to increase or decrease the instantaneous transmission power.

The purpose of the open-loop part is to compensate for the path loss as a terminal further away from the base station needs to transmit with a higher power than a close-by terminal if the two are to be received with the same power.

The purpose of the closed-loop part is to compensate for rapid variations in the instantaneous propagation conditions and to compensate for imperfections in the open-loop power setting. Closed-loop power control commands affecting the uplink data transmissions are included with every uplink scheduling grant.

LTE Uplink Scheduling

All LTE uplink transmissions except for random access transmissions are controlled by the scheduler. A terminal is allowed to transmit in the uplink only when it has received a valid scheduling grant from the network. An uplink grant in LTE is valid for one transport block on the Uplink Shared Channel (UL-SCH) transport channel. A transport block contains the data to be transmitted in one transmission time interval (TTI) of 1 ms length.

Data on the UL-SCH transport channel 302 of an uplink carrier or link 301 is the result of multiplexing one or more logical channels 303a, 303b. A logical channel 303a, or 303b, is characterized by the type of information transmitted. For example, one logical channel 303a could be used for RRC signaling associated with mobility management while another logical channel 303b is used for the user data.

Although the eNodeB scheduler controls the transport block size and the associated transmission parameters such as the modulation scheme of a scheduled mobile terminal, the terminal is responsible for selecting from which logical channels the data is taken. The terminal autonomously handles logical channel multiplexing according to rules, the parameters of which can be configured by the network. This logical channel multiplexing is illustrated in FIG. 3, where the eNodeB scheduler controls the transport format and the mobile terminal controls the logical channel multiplexing.

Each logical channel has a corresponding Radio Link Control (RLC) buffer for buffering its data. Data from multiple logical channels of different priorities can be multiplexed into the same transport block according to a configurable rule. As illustrated in FIG. 3, the Medium Access Control (MAC) offers services to the RLC in the form of logical channels. MAC also handles Hybrid Automatic Repeat Request (HARQ) retransmissions and uplink and downlink scheduling. The Physical Layer (PHY) handles e.g. coding/decoding and modulation/demodulation and offers services to the MAC layer in the form of transport channels.

The simplest rule for multiplexing data from multiple logical channels into a single transport block would be to serve logical channels in strict priority order. However, this may result in starvation of lower-priority channels, as all resources would be given to the high-priority channel until its transmission buffer is empty. Typically, an operator would instead like to provide at least some throughput also for low-priority services. Therefore, for each logical channel in an LTE terminal, a prioritized data rate is configured in addition to the priority value. The logical channels are then served in decreasing priority order up to their prioritized data rate, which avoids starvation as long as the scheduled data rate is at least as large as the sum of the prioritized data rates. Beyond the prioritized data rates, channels are served in strict priority order until the grant is fully exploited or the RLC buffer is empty. Such a prioritization is schematically illustrated in FIGS. 4*a-c*. The content from two logical channels LC1 and LC2, indicated by the stacks LC1 and LC2 respectively, is to be transmitted in decreasing priority order up to the prioritized data rate indicated by 403. LC1 has the highest priority. The scheduled data rate is indicated by the line 401. What is actually transmitted is indicated by stack 402.

LTE Carrier Aggregation

LTE Rel-10 supports carrier aggregation where up to five Component Carriers (CC) can be aggregated to support higher data rates than what would be possible with a single carrier. Scheduling, HARQ retransmissions and PHY processing are handled independently for each CC 501*a-c*, as schematically illustrated in FIG. 5. Several logical channels 503*a*, and 503*b*, are multiplexed and the resulting output is distributed across the scheduled CCs. Data from one logical channel 503*a* may be transmitted on one or more CCs 501*a-c* depending on the payload sizes scheduled for each of the CCs and the logical channel prioritization described above with reference to FIG. 4*a-c*.

In LTE, there is one primary CC and one or more secondary CCs. Uplink control signaling on PUCCH, such as HARQ feedback, and Channel Status Indicator (CSI) reports, is transmitted on the primary CC only, irrespective of which downlink CC(s) that were used for downlink data transmission. Uplink power control is performed independently per uplink CC.

SUMMARY

The soft cell approach described above puts requirements on the wireless device to communicate in the uplink with both the macro node and the pica node. The macro layer may e.g. be used for basic mobility using the associated RRC signaling, and the pico layer may be used for typically high-rate user data. Due to latency limitations in the backhaul network it is in many situations not feasible to receive information from the wireless device in one of the nodes, e.g. the pico node, and forward it to the node needing the information, e.g. the macro node. Hence, the wireless device must be able to transmit in such a way that the appropriate node can receive the information directly. Uplink information targeting a specific node, e.g. the macro or the pico node, consists not only of signaling required to operate the downlink but may also include user data. It is thus desirable to control to which node, i.e. on which link, anchor or booster, a certain logical channel is transmitted, which is currently not possible in LTE.

It is therefore an object to address some of the problems outlined above, and to provide a solution where the wireless device obtains information regarding to what link a logical channel is mapped. This object and others are achieved by the methods as well as the wireless device and the RBS according to the independent claims, and by the embodiments according to the dependent claims.

In accordance with a first aspect of embodiments, a method in a wireless device for mapping a logical channel to one of a first and a second link is provided. The first link is maintained to a first radio network node and the second link is maintained to a second radio network node. The method comprises obtaining information indicating to which of the first and the second links one or more of at least one logical channel is mapped. The method also comprises selecting a logical channel among the at least one logical channel, and mapping the selected logical channel to one of the first and the second links based on the obtained information.

In accordance with a second aspect of embodiments, a method in a first radio network node of a wireless network, for enabling a wireless device to map a logical channel to one of a first and a second link is provided. The first link is maintained to the first radio network node and the second link is maintained to a second radio network node. The method comprises transmitting information to the wireless device, the information indicating to which of the first and the second links one or more of at least one logical channel is mapped, such that the wireless device can map a logical channel to one of the first and second links based on the information.

in accordance with a third aspect of embodiments a wireless device configured to map a logical channel to one of a first and a second link is provided. The first link is maintained to a first radio network node and the second link is maintained to a second radio network node. The wireless device comprises a processing circuit configured to obtain information indicating to which of the first and the second links one or more of at least one logical channel is mapped. The processing circuit is also configured to select a logical channel among the at least one logical channel, and map the selected logical channel to one of the first and the second links based on the obtained information.

In accordance with a fourth aspect of embodiments, a first radio network node for a wireless network, configured to enable a wireless device to map a logical channel to one of a first and a second link. The first link is maintained to the first radio network node and the second link is maintained to a second radio network node. The first radio network node is characterized in that it comprises a transmitter configured to transmit information to the wireless device. The information indicates to which of the first and the second links one or more of at least one logical channel is mapped, such that the wireless device can map a logical channel to one of the first and second links based on the information.

An advantage of embodiments is that the availability of the information regarding the mapping at the wireless device makes it possible to control to which node, i.e. on which link, anchor or booster, a certain logical channel is transmitted. The soft cell approach is thus not dependent on a low latency backhaul network to enable receiving information from the wireless device in one of the radio network nodes, as the wireless device will transmit relevant information to the correct node directly.

Other objects, advantages and features of embodiments will be explained in the following detailed description when considered in conjunction with the accompanying drawings and claims.

DETAILED DESCRIPTION

In the following, different aspects will be described in more detail with references to certain embodiments of the invention and to accompanying drawings. For purposes of explanation and not limitation, specific details are set forth, such as particular scenarios and techniques, in order to provide a thorough understanding of the different embodiments. However, other embodiments that depart from these specific details may also exist.

Moreover, those skilled in the art will appreciate that the functions and means explained herein below may be implemented using software functioning in conjunction with a programmed microprocessor or general purpose computer, and/or using an application specific integrated circuit (ASIC). It will also be appreciated that while embodiments of the invention are primarily described in the form of methods and nodes, they may also be embodied in a computer program product as well as in a system comprising a computer processor and a memory coupled to the processor, wherein the memory is encoded with one or more programs that may perform the functions disclosed herein.

Figure 1:
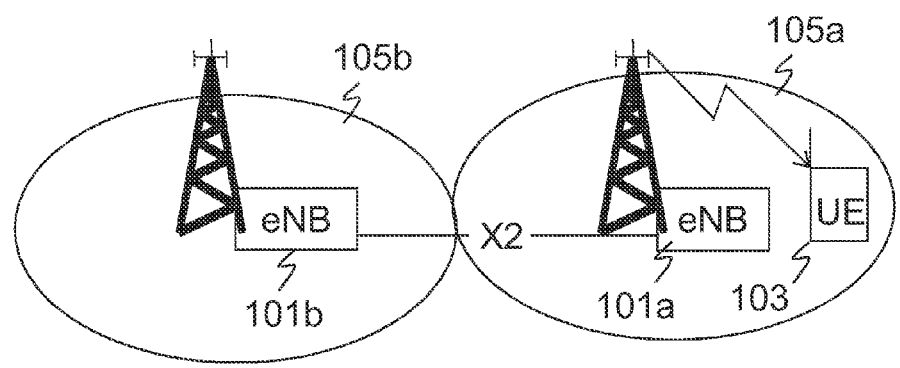
FIG. 1 is a schematic illustration of a radio access network in LTE.
Figure 2A:
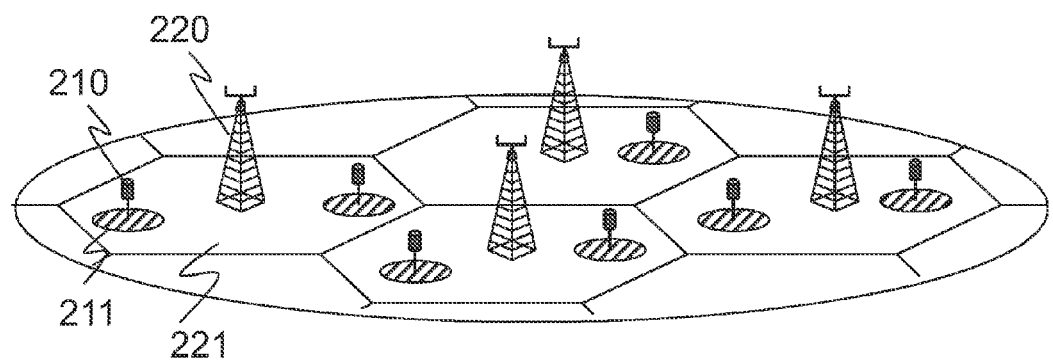
FIG. 2a is a schematic illustration of a heterogeneous deployment with higher-power macro nodes and lower-power pico nodes.
Figure 2B:
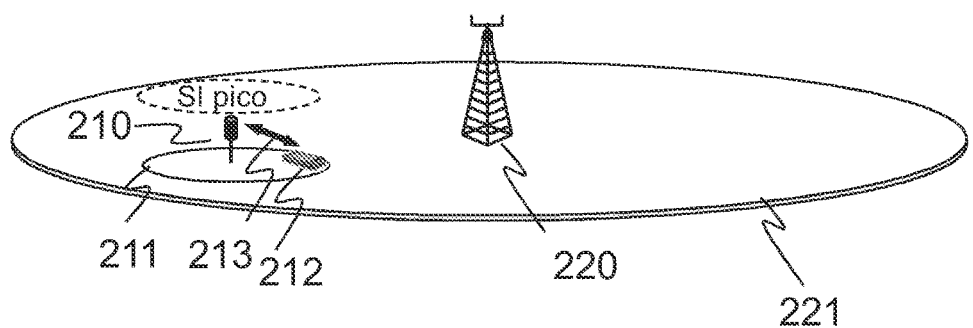
FIG. 2b is a schematic illustration of a traditional macro/pico cell.
Figure 2C:
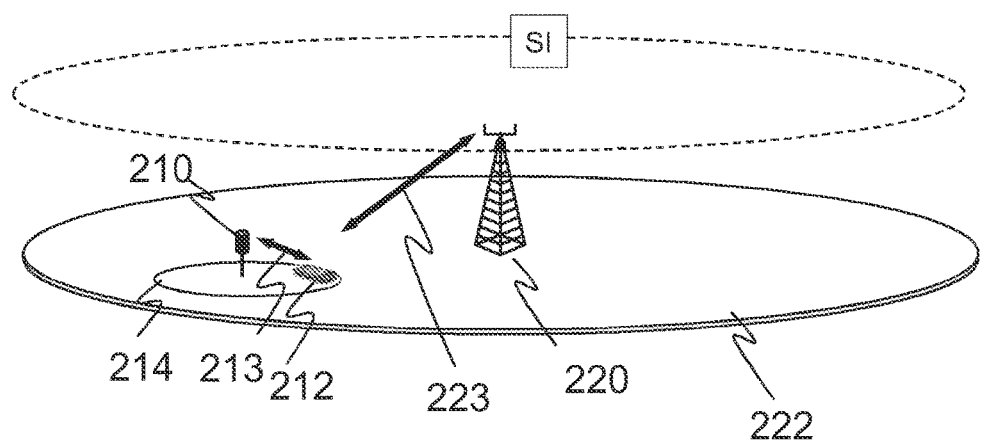
FIG. 2c is a schematic illustration of a soft cell.
Figure 3:
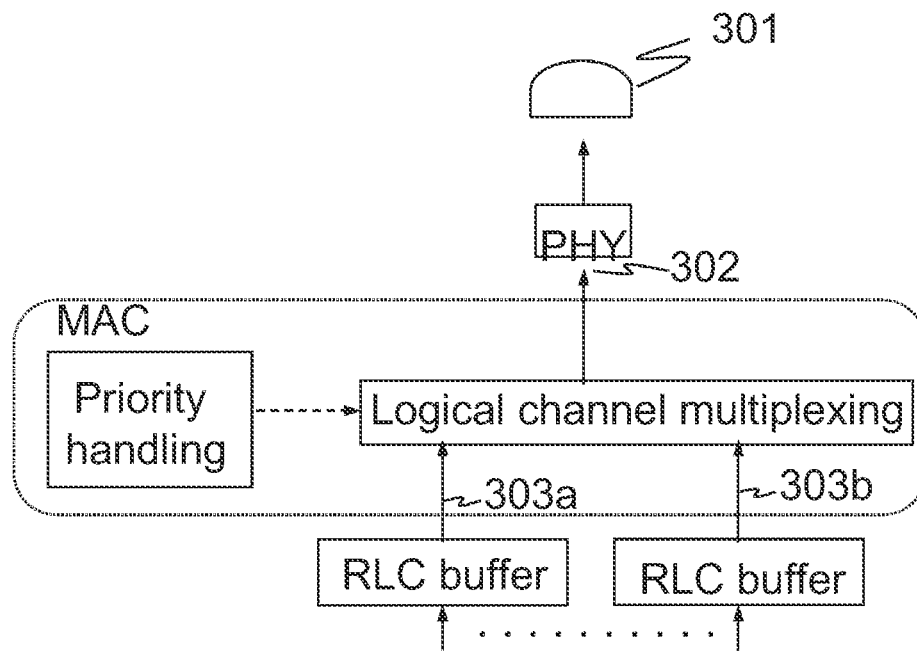
FIG. 3 is a schematic illustration of uplink channel multiplexing and scheduling on one uplink carrier (no carrier aggregation).
Figure 5:
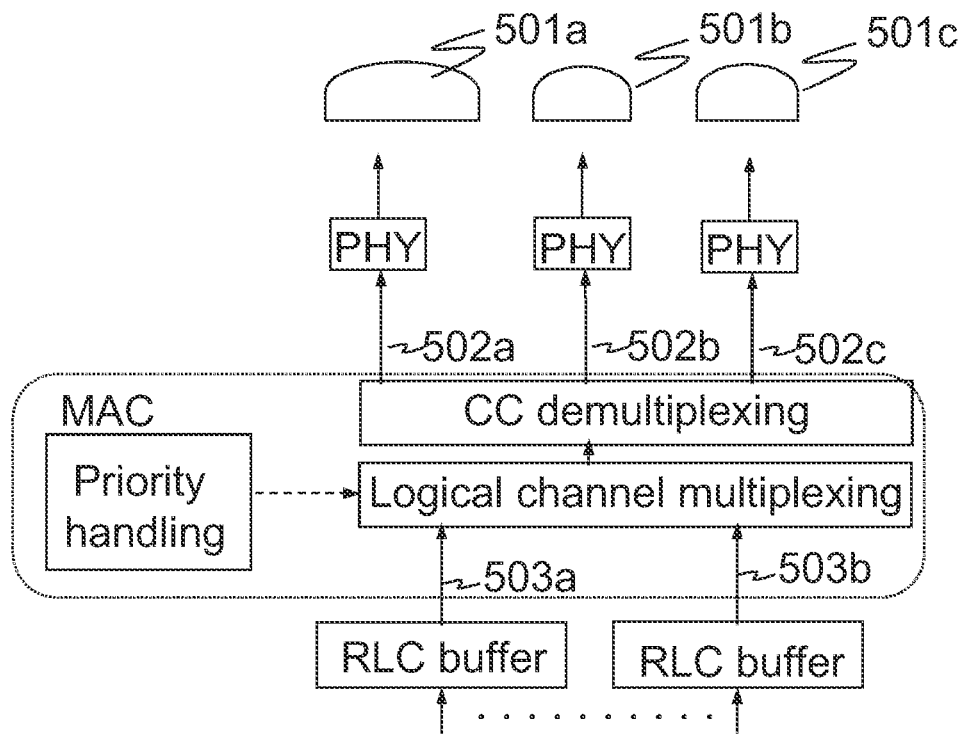
FIG. 5 is a schematic illustration of the multiplexing of multiple logical channels and CC de-multiplexing.
Figure 4A:
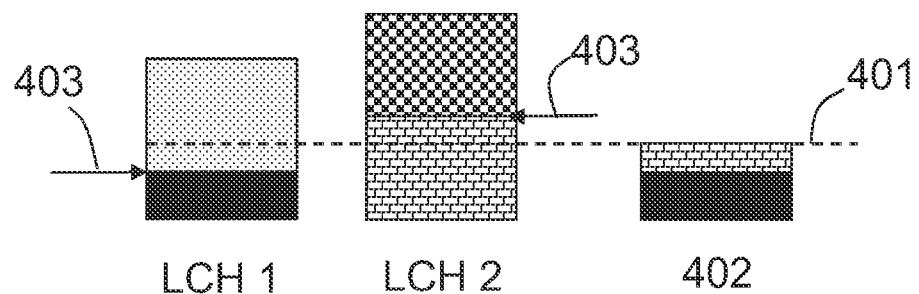
FIGS. 4a-c are schematic illustration of different examples of multiplexing of multiple logical channels onto one transport channel according to prioritization rules.
Figure 4B:
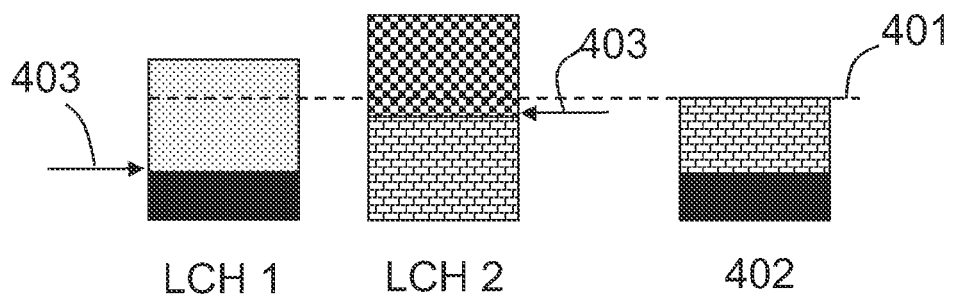
Figure 4C:
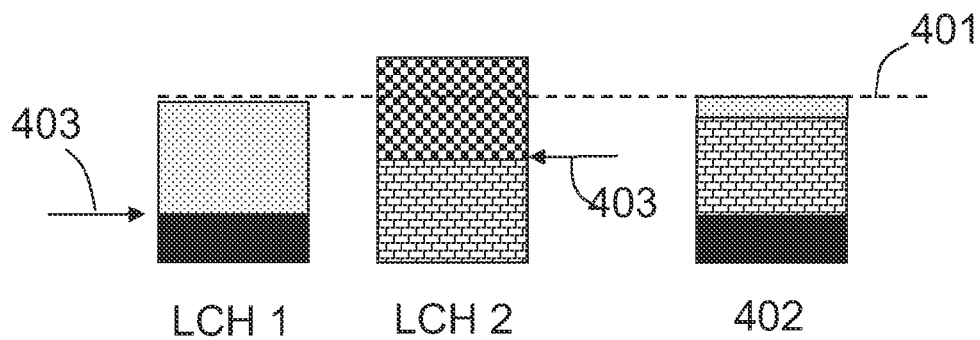

Embodiments are described in a non-limiting general context in relation to an example LTE scenario with a wireless device served by a pico node and a macro node in E-UTRAN, as illustrated in FIG. 2c. However, it should be noted that the embodiments may be applied to any layered radio access network technology supporting the soft cell approach. Furthermore, in a general case the booster and anchor link may correspond to different Radio Access Technologies (RAT), such as an LTE anchor link, and a Wireless Local Area Network (WLAN) booster link. Examples of different wireless devices are UEs, modems, laptops, or Machine Type Communication (MTC) devices such as sensors.

Soft cell has been described in terms of one anchor link and one booster link. However, in combination with carrier aggregation, there could be multiple CCs forming the anchor and booster links, respectively. The term anchor link may thus be understood as the set of CCs forming the anchor link. A similar principle holds for the booster link.

Logical Channel to Link Mapping

The problem of the lack of possibility to control whether a logical channel is mapped to a first link towards the pico node, also called the booster link, or to a second link towards the macro node, also called the anchor link, is addressed by a solution where the wireless device obtains information indicating to which of the first and the second links one or more logical channels are mapped. In one embodiment the wireless device receives the information regarding the mapping from the radio network. Alternatively, the information is pre-configured in the wireless device. Hereinafter, the different alternative embodiments will be discussed in more details.

The current MAC layer in LTE does not support mapping of a certain logical channel to a certain link, CC or set of CCs. Controlling the mapping from logical channels to links or CCs can be done e.g. through new Radio Resource Control (RRC) signaling. The network may, for each logical channel, signal to which link, CC or set of CCs the logical channel can be mapped. For example, each logical channel may be given an attribute stating "anchor only", "booster only", or "any". The "any" attribute, indicates that the logical channel can be transmitted on either of the anchor and booster link. The "any" attribute could be kept as the default unless "anchor only" or "booster only" is explicitly signaled. One may also use only two possibilities for the logical channel attributes, i.e. "anchor" or "booster". Furthermore, the attributes could easily be generalized to more than two links or connections if necessary, where each value of the attribute corresponds to a subset of the links.

As an alternative to RRC signaling, MAC or L1/L2 signaling could be used to control the attributes. According to an embodiment, RRC signaling is used to set up multiple configuration sets, where each configuration set corresponds to specific values of the attributes for one or more logical channels, and the MAC or L1/L2 signaling is used to switch between the pre-configured sets. The configuration sets, and which configuration set to use, could also be wholly or partially pre-determined in the specifications to reduce the amount of signaling.

Figure 6:
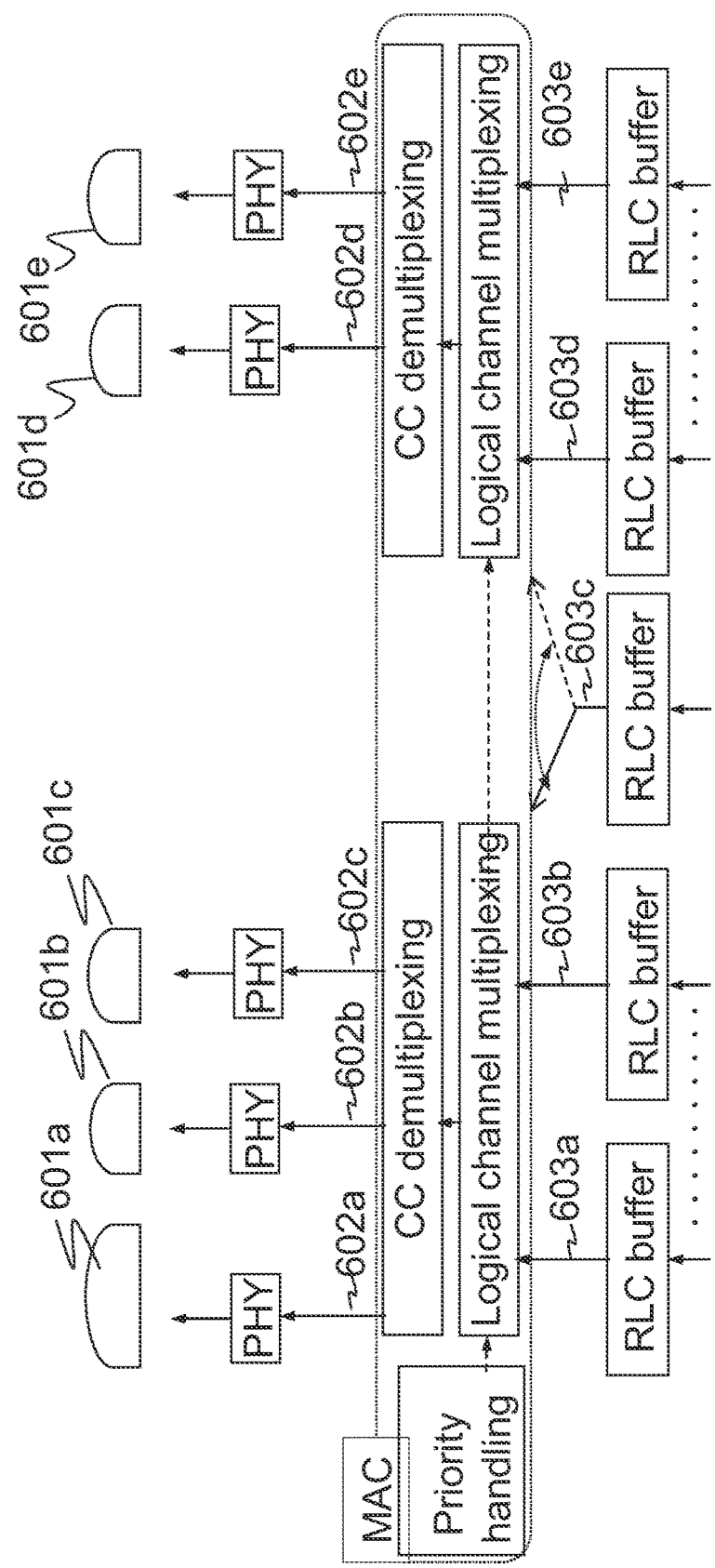
FIG. 6 is a schematic illustration of the multiplexing of multiple logical channels for the soft cell approach according to embodiments of the invention.

The resulting protocol structure is exemplified in FIG. 6. Within the set of logical channels mapped to the anchor and booster links, respectively, logical channel prioritization can be done using the existing LTE mechanisms as described in the background section. The booster link is formed by the CCs 601*a-c*, with their corresponding transport channels 602*a-c*, and the anchor link is formed by the CCs 601*d-e* and their corresponding transport channels 602*d-e*. The logical channels 603*a* and 603*b* are configured to be transmitted on the booster link only. In the example embodiment described above that means that they have been configured with the attribute "booster only". The logical channels 603*d* and 603*e* are configured to be transmitted on the anchor link only, and the logical channel 603*c* is configured to be transmitted on any of the booster or anchor link, i.e. it may be configured with the "any" attribute.

If a logical channel has the any attribute, the selection between the anchor or booster link could be made as part of the priority handling process. As an example, the logical channels A and C may have priority 1 and 3, respectively, and are both mapped to the anchor carrier, while logical channel B have priority 2 and may be mapped to either the anchor or the booster carrier. In this case, and assuming that the wireless device is capable of simultaneous anchor and booster carrier transmission with no power limitation, it could be better to map logical channel B to the booster carrier. Mapping it to the anchor carrier could, depending on the scheduling grant, negatively impact logical channel C if channels A and B would "fill up" the scheduling grant for the anchor carrier. If the available transmission power is not sufficient to transmit both the anchor and booster carriers, i.e. there is a power limitation, it may be better to map logical channel B to the anchor carrier to ensure it is prioritized over logical channel C.

The UE may also exploit the "any" attribute to select the link, i.e. either the anchor or the booster, that is the most beneficial for the UE, for example in terms of energy consumption. If one of the links requires less transmit power than the other, that link may be preferred.

Although the example embodiments described herein use attributes configured to logical channels, such attributes may also be configured on other levels in the protocol stack, e.g. for radio bearers or even for a transport channel instead of for the logical channels. The protocol structure in FIG. 6 may thus be generalized to illustrate radio bearers or data channels instead of logical channels.

Power-amplifier Sharing

The soft cell approach described in the background section puts requirements on the wireless device to communicate in the uplink with both the macro node and the pico node. The macro layer may e.g. be used for basic mobility using the associated RRC signaling, and the pico layer may be used for typically high-rate user data. Macro and pico node transmission can either occur on different frequencies in a frequency-separated deployment, or on the same frequency in a same-frequency deployment. In case the anchor link to the macro layer and the booster link to the pico layer operate on the same frequency, a single power amplifier is sufficient. However, since the instantaneous propagation conditions for transmission to the macro node and the pico node typically differ, it is suboptimal to use the same transmission power for the two links. In case the anchor and booster links operate on different frequencies a straightforward solution would be to use separate power amplifiers for the two links. However, this would increase the complexity of the wireless device and may therefore not be an attractive solution, at least not for low-end terminals.

Embodiments of the present invention provide the solution of time-multiplexing between the booster and anchor links, such that booster and anchor transmissions are not overlapping in time. This allows for a single power amplifier handling both the booster and anchor links. This solution may impact which logical channels that are transmitted in a subframe.

The object of some of the embodiments of the invention is thus to provide a solution where transmissions on the first and on the second carrier are not overlapping in time, such that the power amplifier may be used for one link at a time. Although the embodiments presented hereinafter are described as dependent of the embodiments covering the logical channel to link mapping presented above, they may also be used separately and independently of the logical channel to link mapping solution described herein.

Figure 7:
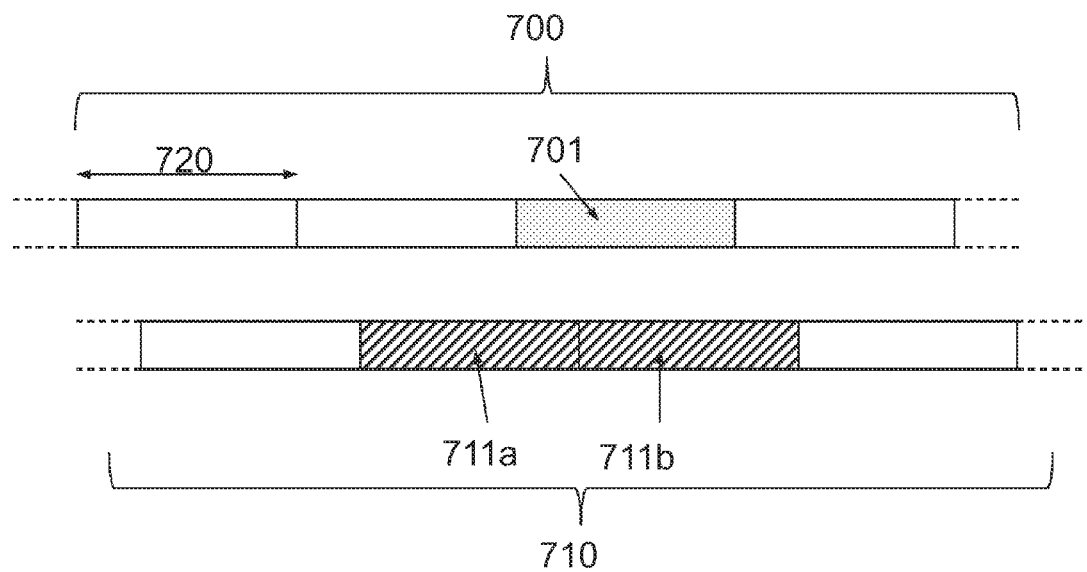
FIG. 7 is a schematic illustration of a scenario when only one of the anchor and booster links are active at a time.

From a terminal complexity point-of-view, a single uplink CC or link is preferable. With multiple uplink links on different frequencies, multiple power amplifiers are needed, or at least a wider-bandwidth single power amplifier in case of the two links being in the same frequency band. This negatively impacts the terminal implementation cost. To address this, only one of the anchor and booster link should be active at a time as illustrated in FIG. 7. Note that the transmission timing can be different for the anchor and booster links, i.e. a subframe 720 on the anchor link 700 may not be time aligned with a subframe 711*a* on the booster link 710. Therefore, a transmission of a subframe 701 on the anchor link 700 may imply that two subframes 711*a-b* on the booster link 710 cannot be used or only partially used for booster link transmissions as they are both partly overlapping with the anchor link subframe transmission.

In one embodiment of the invention, the network may schedule such that transmissions on the anchor and booster links are non-overlapping in time. Since the two links are scheduled by two separate radio network nodes, e.g. the pico and macro node respectively, this requires that the radio network nodes coordinate their scheduling decisions. It should be noted that this typically implies coordination of uplink scheduling and downlink scheduling since downlink data transmission in one subframe with few exceptions results in uplink HARQ feedback transmitted in a later subframe. In one exemplary embodiment, the schedulers in the two nodes agree in advance which node that is allowed to schedule the wireless device in which subframe. This may e.g. be done with coordination messages sent over the X2 interface between the macro and pico node. To avoid error cases in the wireless device it is beneficial to provide the information about which node that schedules in which subframe to the wireless device as well. The wireless device can exploit the information in order to not to obey scheduling grants from a node not allowed to schedule the wireless device in a particular subframe. This thus reduces the risk of incorrectly detecting non-existing scheduling grants, i.e. detecting a grant and transmitting in the uplink despite that the network did not schedule the wireless device in question.

Furthermore, it could also allow for receiver simplifications as the wireless device knows from which node or nodes it could expect scheduling grants in a particular subframe.

Although a semi-static split of resources between the nodes allows for a simplification in the wireless device implementation, it also reduces the efficiency of the network operation. A subframe reserved for communication with the macro node blocks the possibility for pico node communication in at least one subframe even if there is no information to transmit on the logical channels mapped to the macro node. Hence, a more dynamic method of avoiding simultaneous transmission to the macro node and the pico node is desirable. This can be achieved with a prioritization rule in the wireless device; as described hereinafter.

As long as the wireless device is instructed to transmit, either uplink data or uplink control signaling, on only one of the anchor and booster links at the same time, the behavior is straightforward. Upon reception of a grant for the booster link, the wireless device multiplexes the logical channels mapped to the booster link, using e.g. the conventional prioritization algorithms outlined in the background section. The same principle is applied upon reception of a grant for the anchor link. Uplink control signaling, such as HARQ feedback, scheduling requests, Sounding Reference Signals (SRS), and CSI reports, is also transmitted according to the existing LTE principles in these cases.

Figure 8:
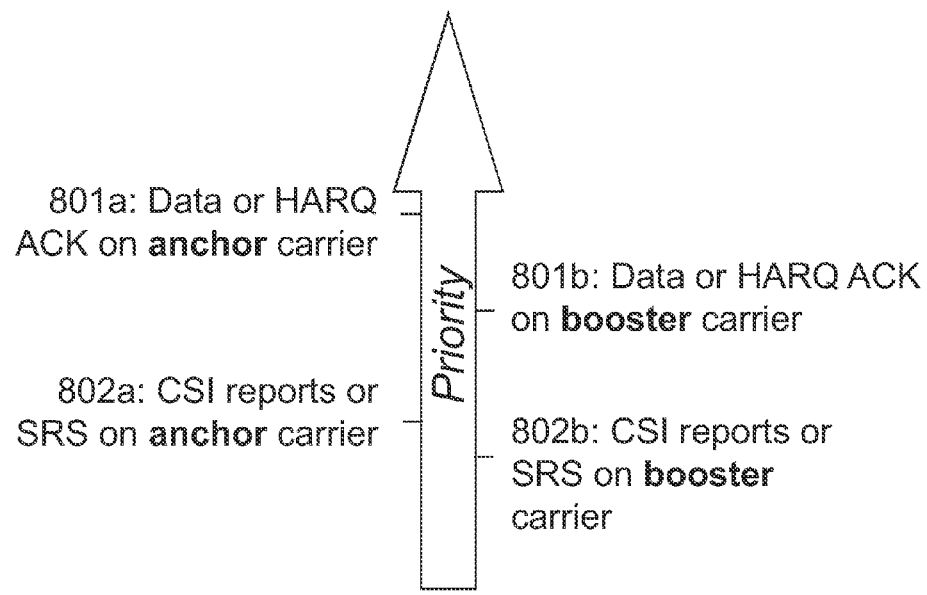
FIG. 8 schematically illustrates one example of a prioritization rule.

However, if the wireless device is instructed to transmit content, i.e. either data or control information, on the anchor and the booster link overlapping in time, it should give priority to one of the links. The wireless device could e.g. at some point in time have data or control information in its logical channel buffers which requires it to transmit on both the anchor and the booster link. The prioritization of link could in one embodiment be made according to pre-defined rules. However, in an alternative embodiment the possibility to semi-statically configure the rules regarding which link to prioritize is provided. The prioritization rule should take both data and control signaling into account and different priorities could e.g. be given to different types of uplink control signaling. In one embodiment, data, HARQ acknowledgements (ACKs) and scheduling requests 801*a* on the anchor link are given priority over the corresponding booster link transmissions 801*b*. The booster link transmissions of data, HARQ ACKs and scheduling requests 801*b* may in turn be given priority over CSI reports and SRS on the anchor link 802*a*, which are prioritized over CSI reports and SRS on the booster link 802*b*. This example of prioritization rule is schematically illustrated in FIG. 8. However, other prioritization rules are also possible.

Within the prioritized link, the wireless device may multiplex logical channels according to the conventional prioritization rules described above. This may imply that a lower-priority logical channel is given priority over a higher-priority logical channel as explained in the following example scenario: Logical channels A and C with priorities 1 and 3 are mapped to the anchor link and logical channel B with priority 2 is mapped to the booster link. Furthermore, scheduling grants are such that anchor and booster transmissions may overlap in time. The wireless device would in this case prioritize the anchor link and transmit data from logical channel A and, if the grant is sufficiently large, from logical channel C. Logical channel B has a higher priority than logical channel C, but since logical channel B is mapped to the booster link, data from that logical channel B cannot be prioritized for transmission. One way of solving this problem is to use the "any" attribute described above in the "Logical channel to link mapping" section for the logical channel B, which would make it possible to map logical channel B on the anchor link as well, and therefore to allow it to be prioritized before the logical channel C.

Description of Methods and Nodes

Figure 9A:
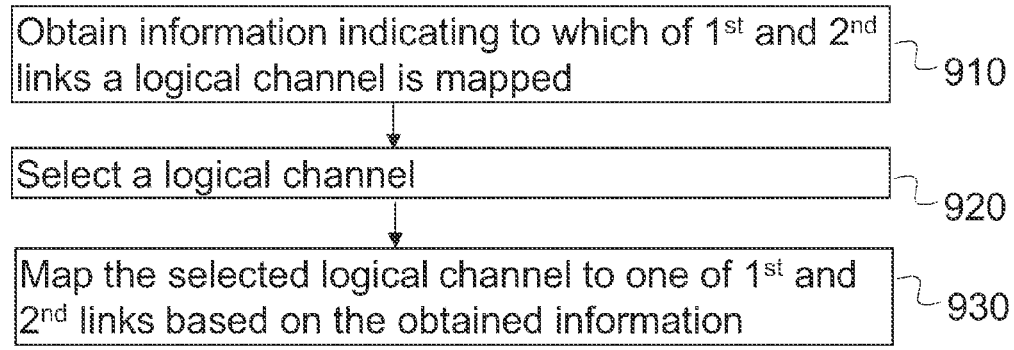
FIGS. 9a-d are flow charts schematically illustrating the method in a wireless device according to embodiments.

FIG. 9*a* is a flowchart illustrating embodiments of a method in a wireless device for mapping a logical channel to one of a first and a second link. The first link is maintained to a first radio network node and the second link is maintained to a second radio network node. The first link may be the anchor link and the second link may be the booster link. The first and the second radio network nodes may be part of a same wireless network, such as an E-UTRAN. Alternatively, the first and the second radio network nodes may be part of two different wireless networks respectively. The method comprises:

910: Obtaining information indicating to which of the first and the second links one or more of at least one logical channel is mapped. The obtained information may comprise an attribute assigned to one or more of the at least one logical channel, wherein a value of the attribute indicates at least one of the first and second links. One example of attributes is the anchor/booster/any attributes described previously. Furthermore, there may be default values of the attribute as described in the previous example, where the "any" attribute is the default unless "anchor only" or "booster only" is explicitly signaled. Consequently, the obtained information may comprise attributes assigned to only a part of the logical channels, and the rest of the logical channels will then keep their default values. The possible alternative embodiments of how to obtain the information are described hereinafter with reference to FIGS. 9*c-d*.

920: Selecting a logical channel among the at least one logical channel. If there are more than one logical channel to select among, the selection of the logical channel may be done based on conventional prioritization rules, thus selecting the logical channel for which the RLC buffer contains content which has the highest priority level. More than one logical channel may also be selected, if the grant allows for it.

930: Mapping the selected logical channel to one of the first and the second links based on the obtained information.

Figure 9B:
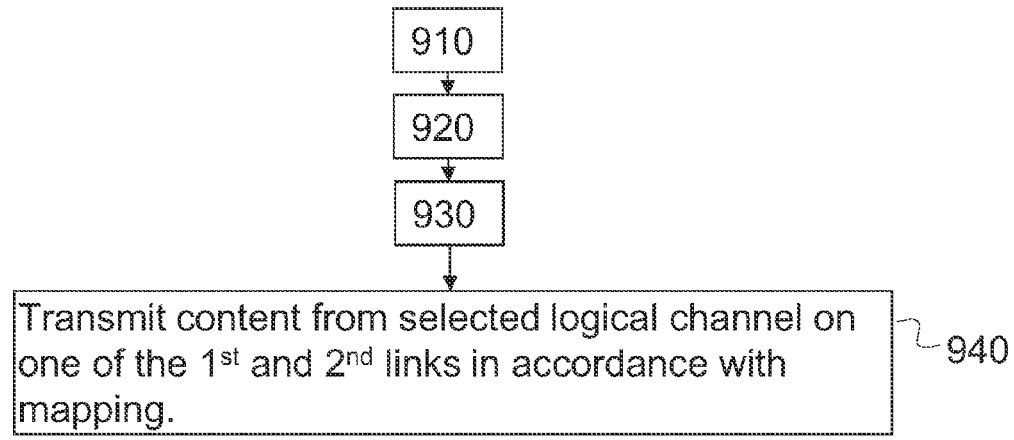

FIG. 9*b* is a flowchart illustrating one embodiment of the method in the wireless device. The method comprises the steps 910, 920 and 930 as described above with reference to FIG. 9*a*. The method further comprises:

940: Transmitting content from the selected logical channel on one of the first and second links in accordance with the mapping. Accordingly, if the selected logical channel is mapped to the first link in step 930, content from this logical channel will be transmitted on the first link.

As described above, more than one logical channel may be selected and mapped to the links, and the selection may be done based on the priority levels of the logical channels. In an optional additional step the selection can take into account what grants are available at the wireless device. The reason for taking the grant into account is e.g. that a logical channel that can only be mapped to the anchor link does not make sense to consider if the wireless device only has received a grant for the booster link.

In one embodiment of the invention, content is transmitted on one prioritized link of the first and second links in a time interval, and the logical channel is selected based on the information obtained in step 910, such that only logical channels mapped to the prioritized link are selected. If a first logical channel is mapped to the first link and a second logical channel is mapped to the second link for transmission in a same time interval, transmission on both links at a same time will occur. Therefore, a prioritization of one of the links is done to avoid parallel transmissions in a time interval, and the selection of logical channels has to be adapted accordingly. The advantage is that only one power amplifier will be needed in the wireless device as it will not transmit on both links at a same time, or in a same subframe.

Another advantage is that different transmission power may be used for the two links, when instantaneous propagation conditions for transmission to the macro node and the pica node differ, as the power amplifier is only used for one link at a time.

The possible alternative embodiments of how to obtain 910 the information will be described hereinafter. In a first embodiment the obtained information may be pre-configured in the wireless device. The information may be stored in a memory of the wireless device and is simply retrieved from the memory when needed. The advantage is that the signaling need is reduced compared to the second and third embodiments described below.

Figure 9C:
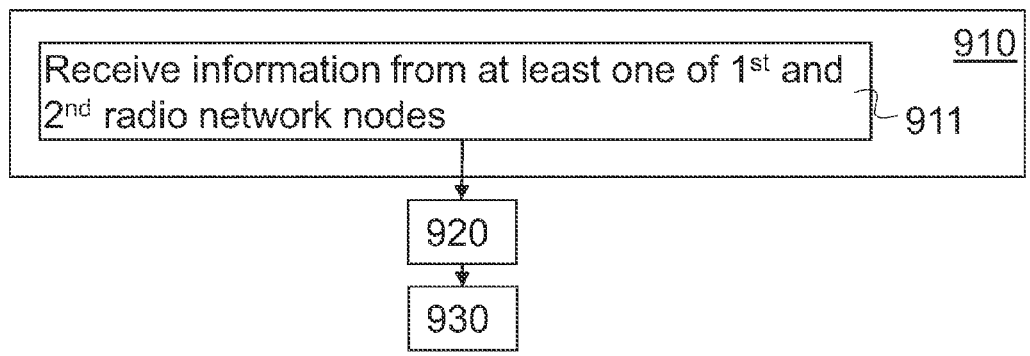

FIG. 9*c* is a flowchart illustrating a second embodiment of how to obtain the information in the method performed in the wireless device. In this second embodiment, obtaining 910 the information comprises receiving 911 the information from at least one of the first and second radio network nodes. The method according to the second embodiment also comprises the steps 920 and 930 as described above with reference to FIG. 9*a*.

Figure 9D:
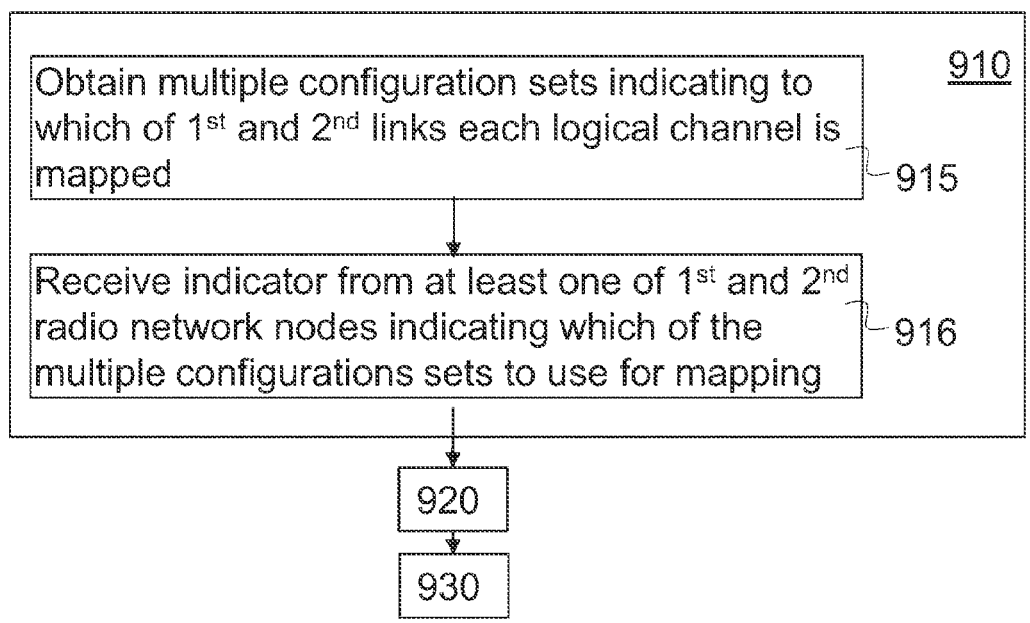

FIG. 9*d* is a flowchart illustrating a third embodiment of how to obtain the information. In this third embodiment, obtaining 910 the information comprises obtaining 915 multiple configuration sets indicating to which of the first and second links one or more of the at least one logical channel is mapped. The multiple configuration sets may be pre-configured in the wireless device, or may be received from at least one of the first and the second radio network node over e.g. an RRC protocol. Obtaining 910 the information also comprises receiving 916 an indicator from at least one of the first and second radio network nodes, indicating which of the multiple configuration sets to use for the mapping in 930. The indicator may be received over a Media Access Control or a Layer 1/Layer 2 protocol. The method according to this third embodiment also comprises the steps 920 and 930 as described above with reference to FIG. 9*a*.

Figure 10A:
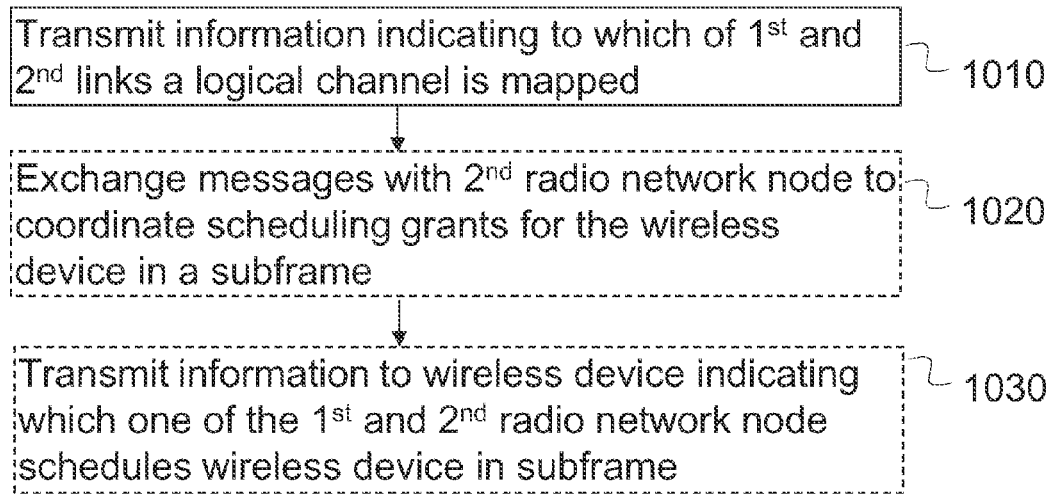
FIGS. 10a-b are flow charts schematically illustrating the method in a first radio network node according to embodiments.

FIG. 10*a* is a flowchart illustrating embodiments of a method in a first radio network node of a wireless network, for enabling a wireless device to map a logical channel to one of a first and a second link. The first link is maintained to the first radio network node and the second link is maintained to a second radio network node. The first link may be the anchor link and the second link may be the booster link. The first and the second radio network nodes may be part of a same wireless network, such as an E-UTRAN. Alternatively, the first and the second radio network nodes may be part of two different wireless networks respectively. The second radio network node may be an RBS, a pica RBS, a micro RBS, a femto RBS, or a relay, but also a remote radio head or a transmission/reception point connected to the first radio network mode. Instead of the term link, the term cell, serving cell or component carrier may also be used.

The method comprises:
1010: Transmitting information to the wireless device. The information indicates to which of the first and the second links one or more of at least one logical channel is mapped, such that the wireless device can map a logical channel to one of the first and second links based on the information. The transmitted information may comprise an attribute assigned to one or more of the at least one logical channel. A value of the attribute indicates at least one of the first and the second links. The anchor/booster/any attributes described above are one example of attribute values.

Optionally, the method may comprise also the following in order to allow for a time-multiplexing between the first and second links:
1020: Exchanging messages with the second radio network node to coordinate scheduling grants for the wireless device in a time interval, such that the wireless device is not scheduled to transmit on both the first and the second link in the time interval. The advantage is that only one power amplifier will be needed in the wireless device as already mentioned above. Furthermore, different transmission power may be used for the two links when needed.
1030: The method may also comprise transmitting further information to the wireless device, the further information indicating which one of the first and second radio network nodes schedules the wireless device in a time interval. This is made to avoid error cases in the wireless device as explained previously.

Figure 10B:
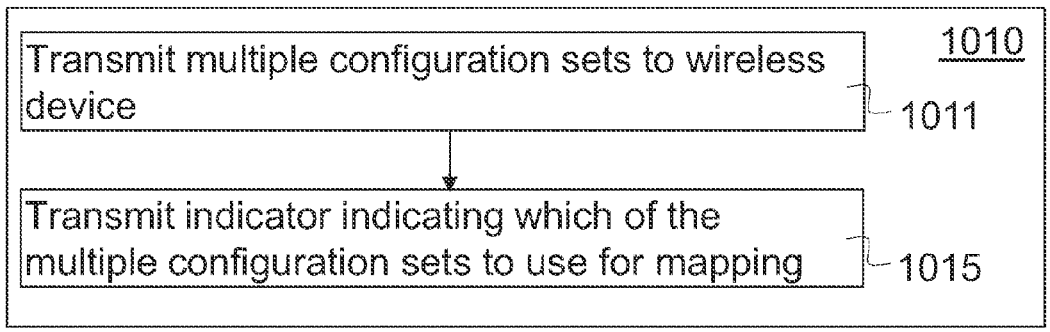

FIG. 10*b* is a flowchart illustrating one embodiment of the method in the first radio network node. In this embodiment transmitting 1010 the information comprises:
1011: Transmitting to the wireless device an indicator indicating which of multiple configuration sets to use for mapping a selected logical channel. The multiple configuration sets indicate to which of the first and the second links one or more of the at least one logical channel is mapped. The indicator may be transmitted over a Media Access Control or a Layer 1/Layer 2 protocol.

Transmitting 1010 the information may also optionally comprise:
1012: Transmitting the multiple configuration sets to the wireless device.

Alternatively, the multiple configuration sets may be pre-configured in the wireless device.

Figure 11:
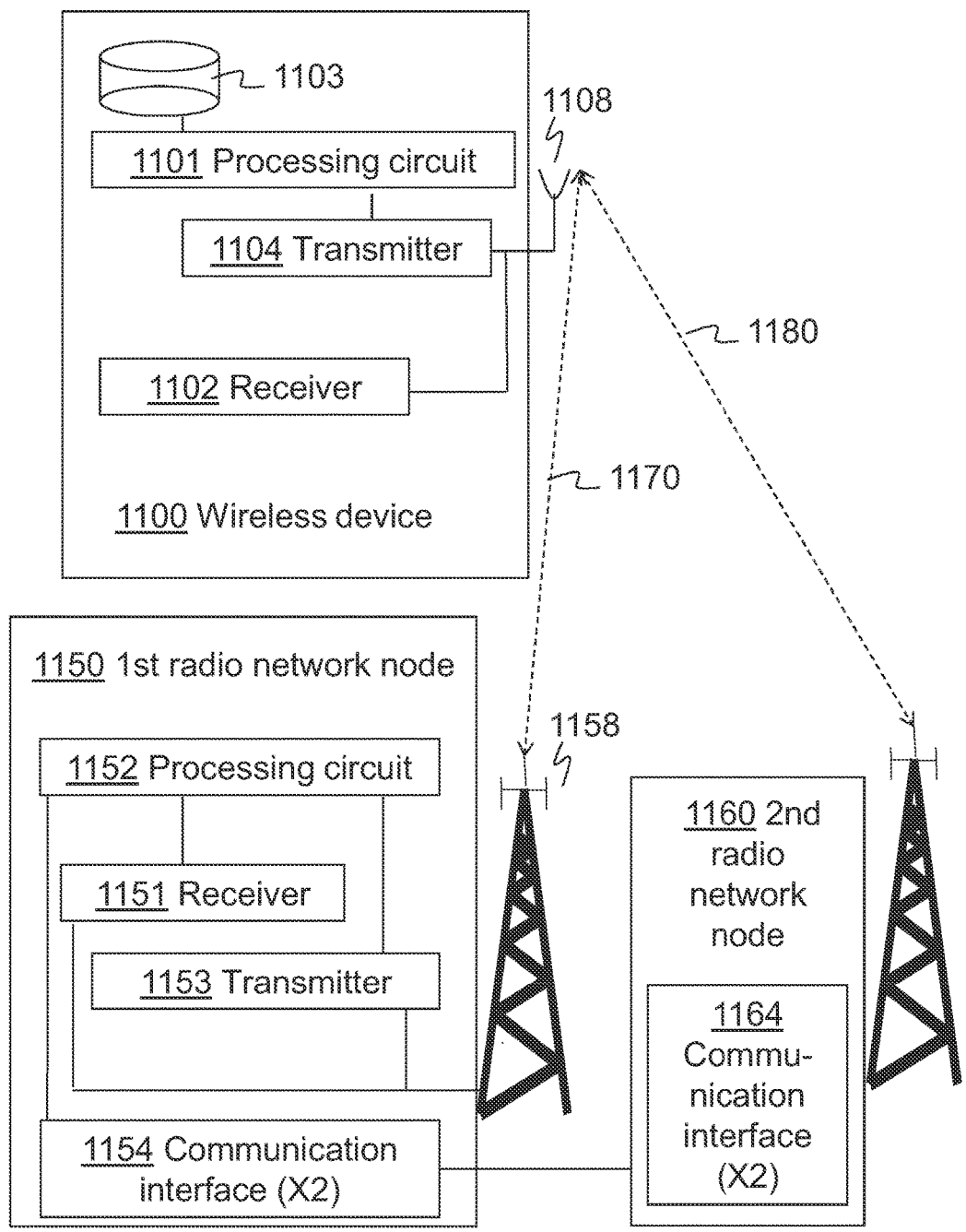
FIG. 11 is a block diagram schematically illustrating a wireless device and a first and a second radio network node according to embodiments.

An embodiment of a wireless device 1100 and a first radio network node 1150 is schematically illustrated in the block diagram in FIG. 11. In one example scenario, the first radio network node may be the macro node 220 illustrated in FIG. 2*c* and described above, and the wireless device may be the terminal 212. The wireless device 1100 comprises a processing circuit 1101, as well as a transmitter 1104 and a receiver 1102 connected to one or more antennas 1108 via antenna ports for the communication with the first and a second radio network nodes, 1150 and 1160. The first radio network node 1150 comprises a processing circuit 1152, as well as a transmitter 1153 and a receiver 1151 connected to one or more antennas 1158 via antenna ports for the communication with the wireless device. The first radio network node 1150 also comprises a communication interface 1154 for the communication with the second radio network node 1160, e.g. over an X2 interface when both the first and the second radio network nodes belong to the same E-UTRAN network. Consequently, the second radio network node 1160 also comprises a communication interface 1164 for the communication with the first radio network node 1150. For the sake of simplicity, the processing circuit, the antennas, the receiver and the transmitter of the second radio network node 1160 are not illustrated in FIG. 11.

The wireless device 1100 is configured to map a logical channel to one of a first and a second link. The first link 1170 is maintained to a first radio network node 1150 and the second link 1180 is maintained to a second radio network node 1160. The wireless device comprises the processing circuit 1101 configured to obtain information indicating to which of the first and the second links one or more of at least one logical channel is mapped. The processing circuit 1101 is also configured to select a logical channel among the at least one logical channel, and map the selected logical channel to one of the first and the second links based on the obtained information.

In one embodiment of the invention, the wireless device further comprises the transmitter 1104 configured to transmit content from the selected logical channel on one of the first and second links in accordance with the mapping.

In another embodiment, the transmitter 1104 is configured to transmit content on one prioritized link of the first and second links in a time interval, and the processing circuit 1101 is configured to select the logical channel based on the obtained information, such that only logical channels mapped to the prioritized link are selected.

The wireless device may further comprise the receiver 1102, and the processing circuit 1101 may be configured to obtain the information from the receiver 1102, which in turn may be configured to receive the information from at least one of the first and second radio network nodes.

In an alternative embodiment, the processing circuit 1101 is configured to obtain the information by obtaining multiple configuration sets indicating to which of the is first and second links one or more of the at least one logical channel is mapped.

The multiple configuration sets may either be preconfigured and retrieved from a memory 1103 in the wireless device, or they may be received from at least one of the first and second radio network nodes. Furthermore, the processing circuit 1101 is configured to obtain the information by receiving an indicator from the receiver 1102 indicating which of the multiple configuration sets to use for the mapping. The receiver 1102 is configured to receive the indicator from at least one of the first and second radio network nodes.

In embodiments of the invention, the first radio network node 1150 for the wireless network is configured to enable a wireless device to map a logical channel to one of a first and a second link. The first link 1170 is maintained to the first radio network node 1150 and the second link 1180 is maintained to a second radio network node 1160. The first radio network node comprises a transmitter 1153 configured to transmit information to the wireless device. The information indicates to which of the first and the second links one or more of at least one logical channel is mapped, such that the wireless device can map a logical channel to one of the first and second links based on the information.

In one embodiment, the transmitter 1153 is configured to transmit the information by transmitting an indicator indicating which of the multiple configuration sets to use for mapping a selected logical channel. The multiple configuration sets indicate to which of the first and the second links one or more of the at least one logical channel is mapped.

The transmitter 1153 may be configured to transmit the information by transmitting the multiple configuration sets to the wireless device.

In one embodiment, the first radio network node may further comprise a communication interface 1154 configured to communicate with the second radio network node 1160. The first radio network node may also comprise a processing circuit 1153 configured to exchange messages with the second radio network node to coordinate scheduling grants for the wireless device in a time interval via the communicating unit 1154, such that the wireless device is not scheduled to transmit on both the first and the second link in the time interval. Optionally, the transmitter 1153 may be configured to transmit further information to the wireless device, the further information indicating which one of the first and second radio network nodes schedules the wireless device in the time interval.

The processing circuits, the communication interfaces, the transmitters and the receivers described above with reference to FIG. 11 may be logical units, separate physical units or a combination of both logical and physical units.

In an alternative way to describe the embodiments in FIG. 11, the wireless device and the radio network nodes comprise each a Central Processing Unit (CPU) which may be a single unit or a plurality of units. Furthermore, they comprise each at least one computer program product (CPP) in the form of a non-volatile memory, e.g. an EEPROM (Electrically Erasable Programmable Read-Only Memory), a flash memory or a disk drive. The CPP comprises a computer program with code means which when run on the wireless device and the radio network nodes respectively causes the CPU to perform steps of the methods described herein. In other words, when said code means are run on the CPU, they correspond to the processing circuits 1101 and 1152 of FIG. 11.

The above mentioned and described embodiments are only given as examples and should not be limiting. Other solutions, uses, objectives, and functions within the scope of the accompanying patent claims may be possible.

The invention claimed is:

1. A method in a wireless device for mapping at least one logical channel alternatively to one of a first link and a second link, wherein the first link is maintained to a first radio network node having a first coverage area and the second link is simultaneously maintained to a second radio network node having a second coverage area smaller than and at least partially encompassed by the first coverage area, the method comprising:
   obtaining, by a processing circuit of the wireless device, information indicating to which one of the simultaneously available first link of the first radio network node carrying a first set of logical channels and second link of the second radio network node carrying a second set of logical channels different than the first set, the at least one logical channel is to be mapped;
   mapping, by the processing circuit, a logical channel of the at least one logical channel, in the alternative, to either the available first link of the first radio network node or the simultaneously available second link of the second radio network node based on the obtained information; and
   transmitting, by a transmitter of the wireless device with the transmitter operationally coupled to the processing circuit, content, with the content from the logical channel, on one of either the first or second link in accordance with the mapping, to a respective first or second radio network node.

2. The method of claim 1:
   wherein transmitting content comprises transmitting content on one prioritized link of the first and second links in a time interval; and
   further comprising selecting a logical channel as the logical channel based on the obtained information such that only logical channels to be mapped to the prioritized link may be selected.

3. The method of claim 1:
   wherein the obtained information comprises an attribute assigned to the logical channel; and
   wherein a value of the attribute indicates at least one of the first and second links.

4. The method of claim 1, wherein the obtained information is pre-configured in the wireless device.

5. The method of claim 1, wherein obtaining the information comprises receiving the information from at least one of the first and second radio network nodes.

6. The method of claim 1, wherein obtaining the information comprises:
obtaining multiple configuration sets indicating to which of the first and second links the logical channel is to be mapped; and
receiving an indicator, from at least one of the first and second radio network nodes, indicating which of the multiple configuration sets to use for the mapping.

7. The method of claim 6:
wherein the multiple configuration sets are pre-configured in the wireless device or are received from at least one of the first and the second radio network node using a Radio Resource Control protocol; and
wherein the indicator is received via a Media Access Control or a Layer1/Layer2protocol.

8. The method of claim 1, further comprising selecting a logical channel from a plurality of logical channels as the logical channel based on priority levels of the plurality of logical channels.

9. A method, in a first radio network node of a wireless network, for enabling a wireless device to map at least one logical channel alternatively to one of a first link and a second link, wherein the first link is maintained to the first radio network node having a first coverage area and the second link is simultaneously maintained to a second radio network node having a second coverage area smaller than and at least partially encompassed by the first coverage area, the method comprising:
determining, by a processing circuit of the first radio network node, to which of the available first link of the first radio network node and the simultaneously available second link of the second radio network node the at least one logical channel is to be mapped in the alternative;
generating information indicating to which of the available first link of the first radio network node and the simultaneously available second link of the second radio network node the at least one logical channel is to be mapped; and
transmitting, by a transmitter of the first radio network node with the transmitter operationally coupled to the processing circuit, to the wireless device, the information indicating to which of the first link of the first radio network node carrying a first set of logical channels and the second link of the second radio network node carrying a second set of logical channels different than the first set the at least one logical channel is to be mapped so that the wireless device can map the logical channel of the at least one logical channel to either the first link or the second link based on the information.

10. The method of claim 9:
wherein the transmitted information comprises an attribute assigned to at least one logical channel; and
wherein a value of the attribute indicates at least one of the first and the second links.

11. The method of claim 9:
wherein transmitting the information comprises transmitting an indicator to the wireless device indicating which of multiple configuration sets to use for mapping a selected logical channel; and
wherein the multiple configuration sets indicate to which of the first and the second links the logical channel is to be mapped.

12. The method of claim 11, wherein transmitting the information further comprises transmitting the multiple configuration sets to the wireless device.

13. The method of claim 12, wherein the multiple configuration sets are transmitted using a Radio Resource Control protocol.

14. The method of claim 11, wherein the multiple configuration sets are pre-configured in the wireless device.

15. The method of claim 11, wherein the indicator is transmitted using a Media Access Control or a Layer1/Layer2 protocol.

16. The method of claim 9, further comprising exchanging messages with the second radio network node to coordinate scheduling grants for the wireless device in a time interval such that the wireless device is not scheduled to transmit on both the first and the second link in the time interval.

17. The method of claim 16, further comprising transmitting further information to the wireless device, the further information indicating which one of the first and second radio network nodes schedules the wireless device in the time interval.

18. A wireless device configured to map at least one logical channel alternatively to one of a first link and a second link, wherein the first link is maintained to a first radio network node having a first coverage area and the second link is simultaneously maintained to a second radio network node having a second coverage area smaller than and at least partially encompassed by the first coverage area, the wireless device comprising:
a processing circuit configured to:
obtain information indicating to which one of the simultaneously available first link of the first radio network node carrying a first set of logical channels and the second link of the second radio network node carrying a second set of logical channels different than the first set the at least one logical channel is to be mapped; and
map a logical channel of the at least one logical channel to either the available first link or the second simultaneously available link based on the obtained information; and
a transmitter operationally coupled to the processing circuit and configured to transmit content, with the content from the logical channel on one of either the first or second link in accordance with the mapping, to a respective first or second radio network node.

19. The wireless device of claim 18, wherein the wireless device further comprises a transmitter configured to transmit content from the logical channel on one of the first and second links in accordance with the mapping.

20. The wireless device of claim 19:
wherein the transmitter is configured to transmit content on one prioritized link of the first and second links in a time interval; and
wherein the processing circuit is configured to select, from a plurality of logical channels, a logical channel as the logical channel based on the obtained information such that only logical channels to be mapped to the prioritized link may be selected.

21. The wireless device of claim 18:
further comprising a receiver configured to receive the information from at least one of the first and second radio network nodes; and wherein the processing circuit is configured to obtain the information from the receiver.

22. The wireless device of claim 18:
further comprising a receiver configured to receive the information from at least one of the first and second radio network nodes;
wherein the processing circuit is configured to obtain the information by:
obtaining multiple configuration sets indicating to which of the first and second links the logical channel is to be mapped; and
receiving an indicator from the receiver indicating which of the multiple configuration sets to use for the mapping.

23. A first radio network node for a wireless network, configured to enable a wireless device to map at least one logical channel alternatively to one of a first link and a second link, wherein the first link is maintained to the first radio network node having a first coverage area and the second link is simultaneously maintained to a second radio network node having a second coverage area smaller than and at least partially encompassed by the first coverage area, the first radio network node comprising:
a processing circuit configured to:
determine to which one of the simultaneously available first link of the first radio network node and the second link of the second radio network node the at least one logical channel is to be mapped; and
generate information indicating to which one of the first link of the first radio network node and the second link of the second radio network node the at least one logical channel is to be mapped; and
a transmitter operationally coupled to the processing circuit and configured to transmit, to the wireless device, the information indicating to which one of the available first link of the first radio network node carrying a first set of logical channels and the simultaneously available second link of the second radio network node carrying a second set of logical channels different than the first set the at least one logical channel is to be mapped so that the wireless device can map the logical channel of the at least one logical channel, in the alternative, to either the first link or the second link based on the information.

24. The first radio network node of claim 23:
wherein the transmitter is configured to transmit the information by transmitting an indicator to the wireless device indicating which of the multiple configuration sets to use for mapping a selected logical channel;
wherein the multiple configuration sets indicate to which of the first and the second links the logical channel is to be mapped.

25. The first radio network node of claim 24, wherein the transmitter is further configured to transmit the information by transmitting the multiple configuration sets to the wireless device.

26. The first radio network node of claim 23 wherein the first network node further comprises:
a communication interface configured to communicate with the second radio network node; and
a processing circuit configured to exchange messages, via the communicating unit, with the second radio network node to coordinate scheduling grants for the wireless device in a time interval such that the wireless device is not scheduled to transmit on both the first and the second link in the time interval.

27. The first radio network node of claim 26 wherein the transmitter is further configured to transmit further information to the wireless device, the further information indicating which one of the first and second radio network nodes schedules the wireless device in the time interval.

* * * * *